US007774494B2

(12) United States Patent
Hauke

(10) Patent No.: US 7,774,494 B2
(45) Date of Patent: Aug. 10, 2010

(54) AUDIO/VIDEO ROUTER

(75) Inventor: Michael Thomas Hauke, Nevada City, CA (US)

(73) Assignee: Thomson Licensing, Boulogne-Bellancourt (FR)

( * ) Notice: Subject to any disclaimer, the term of this patent is extended or adjusted under 35 U.S.C. 154(b) by 763 days.

(21) Appl. No.: 11/664,753

(22) PCT Filed: Oct. 7, 2005

(86) PCT No.: PCT/US2005/036385

§ 371 (c)(1), (2), (4) Date: Apr. 5, 2007

(87) PCT Pub. No.: WO2006/042207

PCT Pub. Date: Apr. 20, 2006

(65) Prior Publication Data

US 2009/0121740 A1 May 14, 2009

Related U.S. Application Data

(60) Provisional application No. 60/616,808, filed on Oct. 7, 2004.

(51) Int. Cl.
*G06F 15/16* (2006.01)

(52) U.S. Cl. ....................... 709/237; 709/204; 709/205; 709/217; 709/227

(58) Field of Classification Search ................. 709/204, 709/205, 227, 217, 237; 725/78, 107, 116, 725/148
See application file for complete search history.

(56) References Cited

U.S. PATENT DOCUMENTS 5,247,347 A 9/1993 Litteral et al.
5,583,652 A * 12/1996 Ware .......................... 386/75
5,600,382 A 2/1997 Won
6,104,997 A 8/2000 Shuholm
6,119,163 A 9/2000 Monteiro et al.
6,351,090 B1 * 2/2002 Boyer et al. ................ 318/139

(Continued)

FOREIGN PATENT DOCUMENTS

| | | |
|---|---|---|
| EP | 1316957 | 6/2003 |
| JP | 07203322 | 8/1995 |
| WO | WO9918728 | 4/1999 |
| WO | WO9946938 | 9/1999 |
| WO | WO0115018 | 3/2001 |

OTHER PUBLICATIONS

Noronha, C.A. Jr. et al.: "Routing of multicast audio/video streams in reconfigurable WDM optical networks", Journal of Network and Systems Management, vol. 4, No. 2, pp. 155-179, Jun. 1996, Plenum, USA.

(Continued)

*Primary Examiner*—Linh V Nguyen
(74) *Attorney, Agent, or Firm*—Robert D. Shedd; Robert B. Levy

(57) ABSTRACT

Technique for Routing digital audio and digital video signals commences by routing a digital video signal, devoid of embedded digital audio, to at least one output, typically by way of a video cross-point switch. At least one digital audio signal undergoes buffering to obtain a prescribed amount of data prior re-timing of the digital audio signal to a prescribed timing format. Following buffering and re-timing, the digital audio signal undergoes routing to at least one output, typically by way of an audio cross-point switch. When routed to outputs associated with each other, the digital audio signal undergoes embedding in the digital video.

15 Claims, 4 Drawing Sheets

U.S. PATENT DOCUMENTS

| | | | | |
|---|---|---|---|---|
| 6,404,811 | B1 * | 6/2002 | Cvetko et al. | 375/240.01 |
| 6,480,584 | B2 | 11/2002 | Duran et al. | |
| 6,754,439 | B1 * | 6/2004 | Hensley et al. | 386/111 |
| 6,847,687 | B2 * | 1/2005 | Fujita et al. | 375/240.25 |
| 6,873,629 | B2 * | 3/2005 | Morris | 370/535 |
| 7,023,924 | B1 * | 4/2006 | Keller et al. | 375/240.26 |
| 7,460,173 | B2 * | 12/2008 | Lundblad et al. | 348/515 |
| 7,558,472 | B2 * | 7/2009 | Locket et al. | 386/125 |
| 2004/0082316 | A1 | 4/2004 | Duran et al. | |
| 2004/0170159 | A1 * | 9/2004 | Kim et al. | 370/352 |
| 2004/0240446 | A1 * | 12/2004 | Compton | 370/389 |
| 2006/0146184 | A1 * | 7/2006 | Gillard et al. | 348/398.1 |
| 2007/0248115 | A1 * | 10/2007 | Miller et al. | 370/466 |

OTHER PUBLICATIONS

Piercy, J.: "Welcome to the real world real-time video over WAN", Communications News, vol. 35, No. 2, pp. 22-23, Feb. 1998, Nelson Publishing, USA.

Reynolds, K.Y. et al: "Multiplexing and demultiplexing digital audio and video in today's digital environment," SMPTE Journal, USA, vol. 102, No. 10, pp. 905-909, Oct. 1993.

Roe, G.: "Integrated routing in a hybrid environment", International Broadcast Engineer, UK, vol. 22, No. 245. pp. 44-46, Jul. 1991.

Mar. 15, 2006—Search Report.

* cited by examiner

PRIOR ART 100

AUDIO/VIDEO ROUTER

CROSS-REFERENCE TO RELATED APPLICATIONS

This application claims the benefit, under 35 U.S.C. §365 of International Application PCT/US2005/036385, filed Oct. 7, 2005 published in accordance with PCT Article 21(2) on Apr. 20, 2006 n English and which claims the benefit of U.S. provisional patent application No. 60/616,808 filed Oct. 7, 2004.

TECHNICAL FIELD

This invention relates to a technique for routing of audio and video signals.

PRIOR ART

The advent of digital coding techniques now permits the coding of one or more audio signals in a bit stream, thus creating "digital audio" or "digital audio signals". For example, the Audio Engineering Society (AES) has established specific standards for digital audio signals (AES3-1992, revised 1997). This standard defines a group of two channels, frequently representing the two channels of a stereo pair. The transmission and distribution of such digital audio signals can occur by transmitting such signals over dedicated links, i.e., links that carry only digital audio signals. Alternatively, such digital audio signals can be multiplexed, i.e., embedded, in a digital video signal yielding a combined audio and video signal routed over a single path. Typically, several AES groups can be multiplexed into a single video signal; such groups can together represent the various components of multi-channel surround sound, and/or audio in several languages, and/or main program and special audio signals such as descriptive audio for the vision-impaired. Such video signals with embedded audio can undergo routing by means of a video router, but this approach does not permit independent routing of the video and audio, or the reassignment of groups, or the selection of a specific language, or the reversal of stereo pairs when so required.

Presently, flexible routing of digital audio and digital video signals, so as to permit functions such as those described above, occurs by separate audio and video routers, respectively. Incoming video signals, each with one or more embedded digital audio signals typically undergo de-embedding, a process that includes recovery of the clock signal and demultiplexing of the digital audio signal(s) from the digital video signal. The digital video signals and digital audio signals undergo routing to one or more destinations. The digital audio signals(s) routed to the same destination as a particular digital video signal typically undergo multiplexing with that digital video signal. For example, the digital audio signal(s) routed to the first destination of the audio router can undergo embedding with the digital video signal at the first destination of the video router, resulting in a single output of video with the required embedded audio. Preferably the digital audio router is equipped with receivers that permit multi-channel swapping as described in U.S. Pat. No. 6,104,997. This approach permits the output to comprise a video from one source with embedded audio that can be derived from one or more different sources. In addition, the audio groups in the output video could be ordered differently from the ordering at the source(s), and optionally stereo pairs could be reversed if necessary.

Various other operations can be performed in the process of routing the audio and assembling a multiplex at the destination. For example, one multiplex could feed a transmission circuit where English Language must be placed in audio Group #1, and French language in audio Group #2, whereas another transmission circuit mat require the same video, but with the language groups reversed so that French appears in the primary position. Another destination could feed a transmission circuit that requires monophonic audio; in this case the two channels of a Group need to be summed and the resultant sum placed in channel "A" and/or "B" of the Group in the output multiplex. These and many similar operations can be performed by a router employing the current invention and equipped with receivers that permit multi-channel swapping as described in U.S. Pat. No. 6,104,997.

The present approach to routing digital audio and video signals requires a de-embedder circuit prior to each input of the video router for de-embedding the digital audio as well as an embedder circuit following each video router output. Each de-embedder circuit includes separate blocks for clock timing recovery, de-serialization, and audio extraction. Each embedder circuit performs clocking timing recovery de-serialization, digital audio signal insertion and serialization. Present day audio and video routers themselves performs some of the same tasks as the de-embedder and embedder circuits, thus duplicating functionality of these devices which increases costs and adds to complexity Thus, a need exists for simplified routing of audio and video signals, and for enhanced flexibility in directing audio from one or more groups of one or more sources to directed groups in an output multiplex.

BRIEF SUMMARY OF THE INVENTION

Briefly, in accordance with an illustrative embodiment of the present principles, there is provided a technique for routing digital audio and digital video signals. The method commences by routing a digital video signal, to at least one output, typically by way of a video cross-point switch. At least one digital audio signal undergoes buffering. The purpose in buffering, i.e., delaying the audio, is to buffer enough data so it doesn't underflow for video lines in which there is less or no audio data. The buffered audio data undergoes re-timing to a prescribed timing format. Following buffering and re-timing, digital audio signal undergoes routing to at least one destination, typically by way of an audio cross-point switch. When routed to destinations associated with each other, the digital audio signal undergoes embedding in the digital video prior to the output of the multiplexed signal.

DETAILED DESCRIPTION

As described hereinafter, the digital audio/video router of the present principles advantageously routes audio and video signals to a given destination with the digital audio signal embedded in the digital video signal with reduced complexity. To better understand how the digital audio/video router of the present principles differs from the prior art, a brief description of two prior art audio video routers will prove useful.

Figure 1:
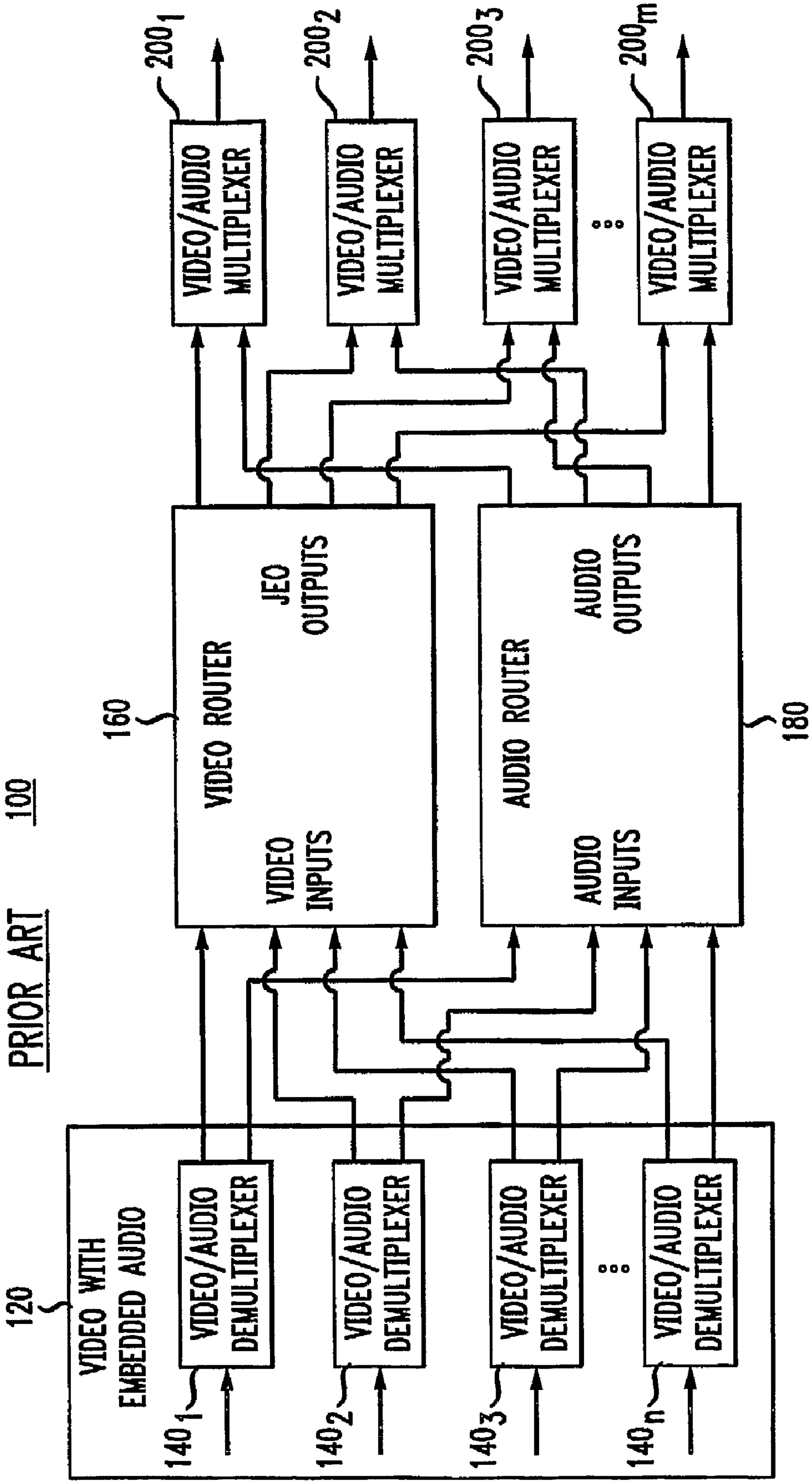
FIG. 1 depicts a block schematic diagram of an audio/video router according to the prior art.

FIG. 1 depicts a block schematic diagram of an audio/video router system 100 according to the prior art. The prior art audio/video router system 100 includes a demultiplexer bank 120 comprised of a plurality of demultiplexers $\mathbf{140}_1$-$\mathbf{140}_n$, where n is an integer. Each of the demultiplexers $\mathbf{140}_1$-$\mathbf{140}_n$ demultiplexers an incoming digital video signal with embedded digital audio to yield separate digital video and digital audio signals supplied to the separate inputs of a video router 160 and an audio router 18, respectively. The digital video router 160 routes each digital video signals at a given input to one or more of its outputs, whereas the digital audio router 160 routes the digital signals at a given one of its inputs to one or more of its outputs. Each of a plurality of multiplexers $\mathbf{200}_1$-$\mathbf{200}_m$, where m is an integer, multiplexes the digital video signal from an associated one of the outputs of the digital video router 160 with one or more digital audio signals from a corresponding output of the digital audio router 180. Thus, for example, the multiplexer $\mathbf{20}_1$ multiplexes the digital video signal from a first output of the digital video router 160 with the digital audio signal(s) at the first output of the digital audio router 180. In a similar fashion, the multiplexer $\mathbf{20}_2$ multiplexes the digital video signal from the second output of the digital video router 160 with the digital audio signal(s) at the second output of the digital audio router 180.

The audio/video router 100 of FIG. 1 incurs the disadvantage of duplicative functionality. The video and audio routers 160 and 180, respectively, each perform equalization on their respective inputs, despite such equalization occurring within each of the demultiplexers $\mathbf{140}_1$-$\mathbf{140}_n$. Likewise, each of the video and audio routers 160 and 180, respectively also perform re-clocking (re-synchronization of the digital signal timing) of their respective input signals, as do each of the demultiplexers $\mathbf{140}_1$-$\mathbf{140}_n$. The video and audio routers 160 and 180, respectively also re-clock their respective output signals, with such re-clocking also performed by each of the video/audio multiplexers $\mathbf{200}_1$-$\mathbf{200}_m$. Such duplication of functionality adds additional cost and can cause other difficulties.

Figure 2:
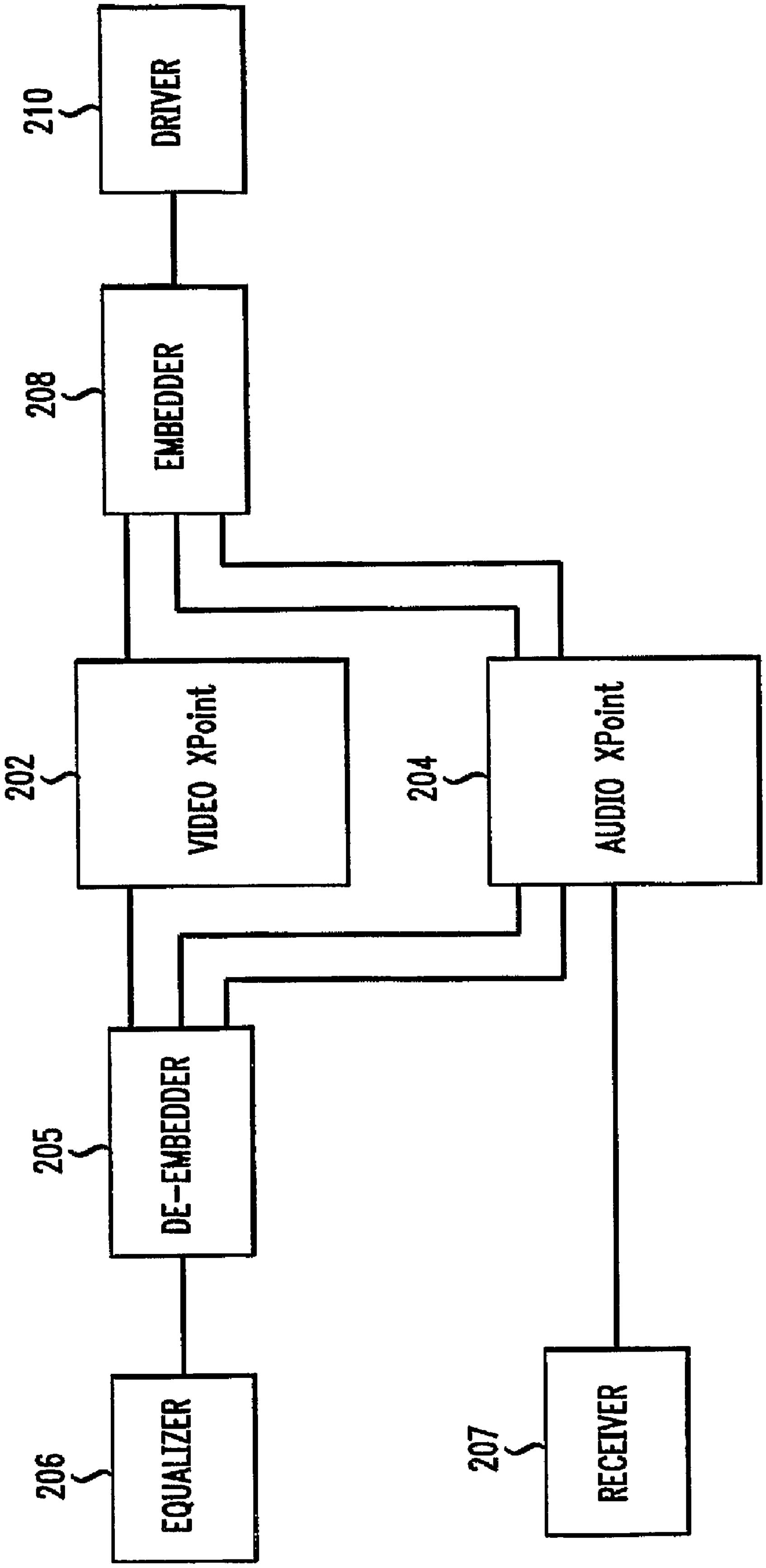
FIG. 2 depicts a block schematic diagram of an audio/video router in accordance with a preferred embodiment of the present principles

FIG. 2 depicts a block schematic diagram of an audio/video router 200 in accordance with an illustrative embodiment of the present principles. The router 200 comprises a video cross-point switch 202 and an audio cross-point switch, each of which could route a signal at its input to one or more of its outputs. In contrast to the video and audio routers and audio routers 160 and 180, respectively, the video and audio cross-point switches 202 and 204, respectively, contain no equalization and re-clocking capability, which, as will become better understood hereinafter, reduce system complexity.

An incoming digital video signal destined for routing by the video cross-point switch 202 first typically undergoes equalization by an equalizer circuit 206. A de-embedder circuit 208, described in detail with respect to FIG. 3, serves to de-multiplex the digital audio signals, if any, embedded in the digital video signal equalized by the equalizer circuit 208. Although not explicitly shown in FIG. 2, each input and output of the video cross-point switch 202 will have an associated de-embedder and embedder circuit respectively. In practice, the incoming video signal, when embedded with audio, will contain at least one and as many as four separate audio groups, each group comprising two channels according to the AES 3 standard. Thus, each group comprises two "streams" or "pairs" of signals, with each stream comprising up to two audio channels, typically a left and a right stereo channel, although each signal in each group can exist independently of the others. Typically, the digital video signal will have one or two embedded stereo digital audio groups. The channels within a group can undergo summing provide a monophonic signal inserted into at least on of the channels of the group.

The video signal, possibly stripped of the embedded audio, passes to one of the inputs of the video cross-point switch 202, whereas the de-embedded audio signal(s) stripped from the digital video signal pass to an input of the audio cross-point switch 204. The digital audio signals from each digital video signal could undergo routing as a single entity, or audios from a plurality of inputs could be routed to different groups of a destination multiplex. Alternatively, for example, one or two stereo digital audio channels at each input of the audio cross-point switch 204 could undergo routing to the same destination. Note that although the audio is "extracted" or stripped to provide a digital audio stream, this process could comprise a copying operation and the audio is not necessarily deleted from the video stream. If no separate audio routing is required, the multiplexed audio could remain undisturbed, or the existing audio data may be deleted at the output when new audio is inserted.

Note that although the audio is typically stripped or extracted from the video to provide a digital audio stream, the process of obtaining the audio could comprise a copying operation so that audio is not necessarily deleted from the video stream. If no separate audio routing is required, the multiplexing can be left undisturbed, or the existing audio data may be deleted at the output when new audio is inserted.

In addition to routing the digital audio signals extracted from each incoming digital video signal, the audio cross-point switch 204 also routes digital audio signals received independently of the video signal. Thus, for example, the audio cross-point switch 204 will route an audio signal received at a switch input from a receiver circuit 208.

The routing of digital video and digital audio signals by the video and audio cross-point switches 202 and 204, respectively, typically occurs independently. Thus, for example, a digital video signal at the first input of the video cross-point switch 202 could undergo routing to an output M of the switch. Conversely, the digital audio originally embedded with that video signal could undergo routing to output N of the audio cross-point switch 204, typically where M≠N, although such need not be the case.

In practice, the digital audio signals at each audio cross-point switch 204 output undergo embedding with the digital video signal appearing at the associated output of the video cross-point switch 202. Such embedding occurs at via an embedder circuit 208 described in detail with respect to FIG. 3. Thus, for example, the digital audio signals at output #1 of the audio cross-point switch 204 undergo embedding with the video signal routed to output #1 of the video cross-point switch 202, if necessary replacing any existing embedded audio. A driver circuit 210 serves to couple the digital video and embedded audio signal output by the embedder circuit 208 to coaxial cable or other such transmission medium. Although not explicitly depicted in FIG. 2, the digital audio signals at output #2 of the audio cross-point switch 204 undergo embedding with the digital video signal at output #2 of the video cross-point switch 202. Similarly, the digital audio signal at output #3 of the audio cross-point switch 204 output undergoes embedding with the digital video signal at the output #3 of the video cross-point switch output 202 and so on.

Figure 3:
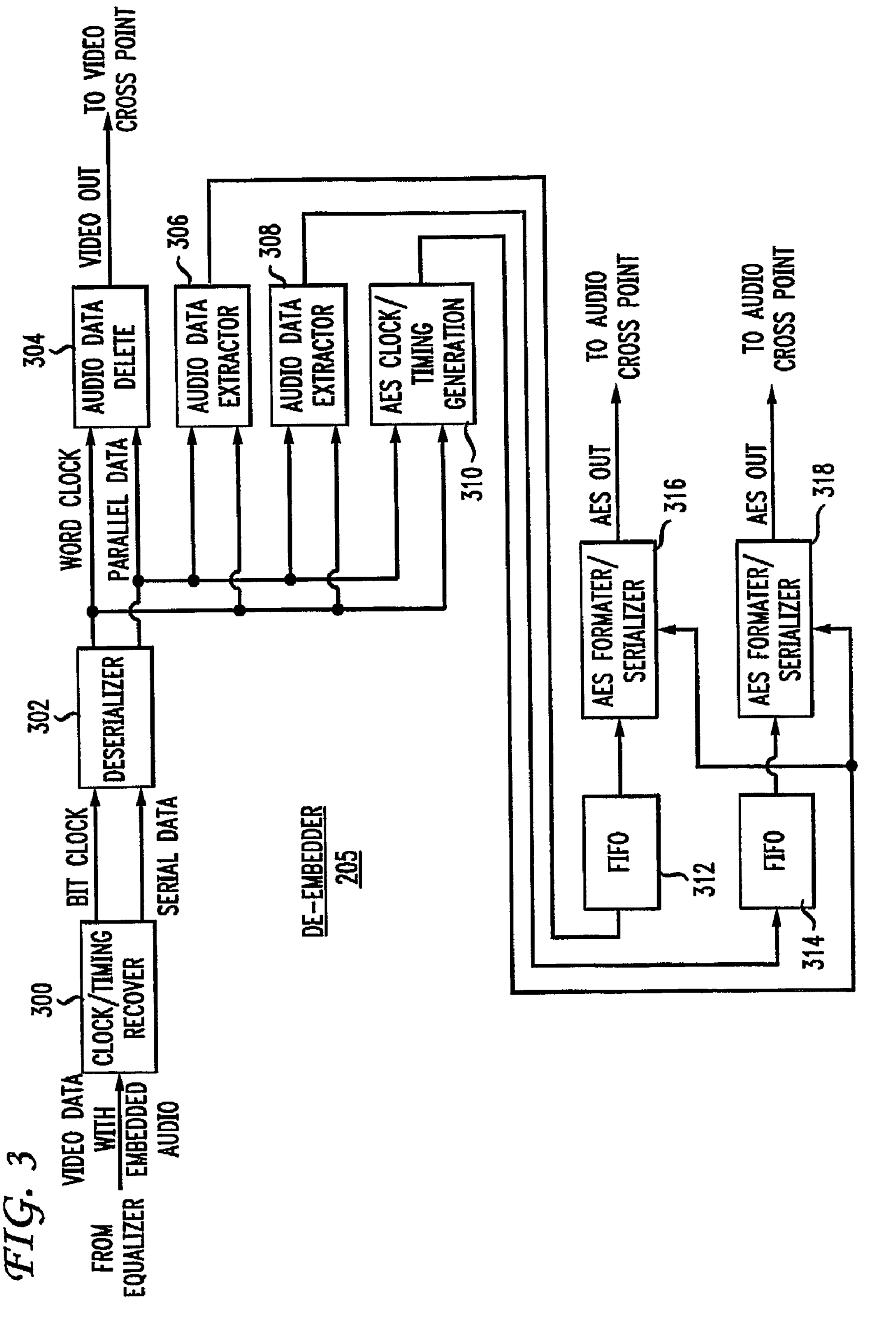
FIG. 3 depicts a block schematic diagram of a de-embedder circuit for use with the audio/video router of FIG. 2.

FIG. 3 depicts a block schematic diagram of the de-embedder circuit 205 for use with the router 200 of FIG. 2. The de-embedder circuit 205 of FIG. 3 includes a clock/timing recovery circuit 300 that receives the incoming digital video signal embedded with one or more groups of digital audio signals. The clock/timing bit recovery circuit 300 recovers the clock signal, thus yielding a bit clock and serial data signal at its output. A de-serializer circuit 302 converts the bit clock and serial data signals from the clock/timing bit recovery circuit 300 to a word clock signal and parallel data stream embodying the digital video and embedded digital audio signal(s).

The word clock signal and parallel data stream pass to each of an audio data delete circuit 304, a first audio data extractor circuit 306, a second audio data extractor circuit 308, and an AES Clock/timing generation circuit 310. The audio delete circuit 304 strips the embedded digital audio in the parallel data stream received from the de-serializer circuit 302 to yield a digital video signal synchronized with the word clock for receipt at an input of the video cross-point switch 202. The audio data extractor circuits 306 and 308 each serve to extract a separate one of a group of embedded audio signals in the parallel data stream produced by the de-serializer circuit 302. In practice, the embedded audio includes two groups of AES digital audio signals, hence the presence of the two extractor circuits 306 and 308. A larger or smaller number of groups of embedded digital audio signals will dictate a larger or smaller number of extractor circuits.

The AES clock/timing generation circuit 310 uses the word clock and the parallel data stream from the de-serializer circuit 302 to generate a clock signal for maintaining proper timing of Audio Engineering Society (AES)-compliant digital audio signals. Digital audio signals used within the broadcast, professional and motion picture industry typically comply with the AES standard. Thus, the ability to resynchronize AES-compliant digital audio signals de-embedded from the incoming video signals becomes important. To the extent that the digital audio signals stripped from the incoming digital video do not comply with the AES standard, but comply with another standard having different timing requirements, the clock/timing circuit 310 would resynchronize the digital audio signals to such a standard. In practice, the AES clock/timing circuit 310 circuit can comprise a phase lock loop or direct synthesis circuit.

The groups of digital audio signals extracted by the audio data extractor circuits 306 and 308 undergo buffering in buffers 312 and 314, respectively, each taking the form of a First in-First out (FIFO) device for buffering a group of digital audio signals. As with the extractor circuits 306 and 308, a larger number of groups of embedded digital audio signals will dictate a larger number of buffers. The buffers 312 and 314 each receive a digital audio signal extracted from each new incoming digital video signal. At start up, or when the audio data is switched or disrupted, the buffers 312 and 314 are cleared and then each accumulate data until receipt of a sufficient amount of data that the buffer reaches a predetermined level, thus generating a signal at its output indicating the proper level has been reached. Each buffer typically has a sufficient size so that the buffer does not underflow or overflow due to varying distribution of embedded digital audio in the incoming video signal.

Upon receiving the signal that the proper level has been reached in a respective one of the buffer circuits 312 and 314, each of a respective one of AES formatter circuits 316 and 318, respectively, begins reading the data out of its associated one of buffer circuits 312 and 314, Each of the AES formatter/serializer circuits 316 and 318 formats the digital audio signals within each group received from the associated buffer into the AES format and synchronizes the signal to the AES clock signal from the circuit 310. To the extent that the buffered digital audio signals have a format different from the AES format, the formatter/serializer circuits would format the signals accordingly. The AES-formatted digital audio signals within each group output by the AES format serializer circuits 316 and 318 pass to an input of the audio cross-point switch 204 of FIG. 2

Figure 4:
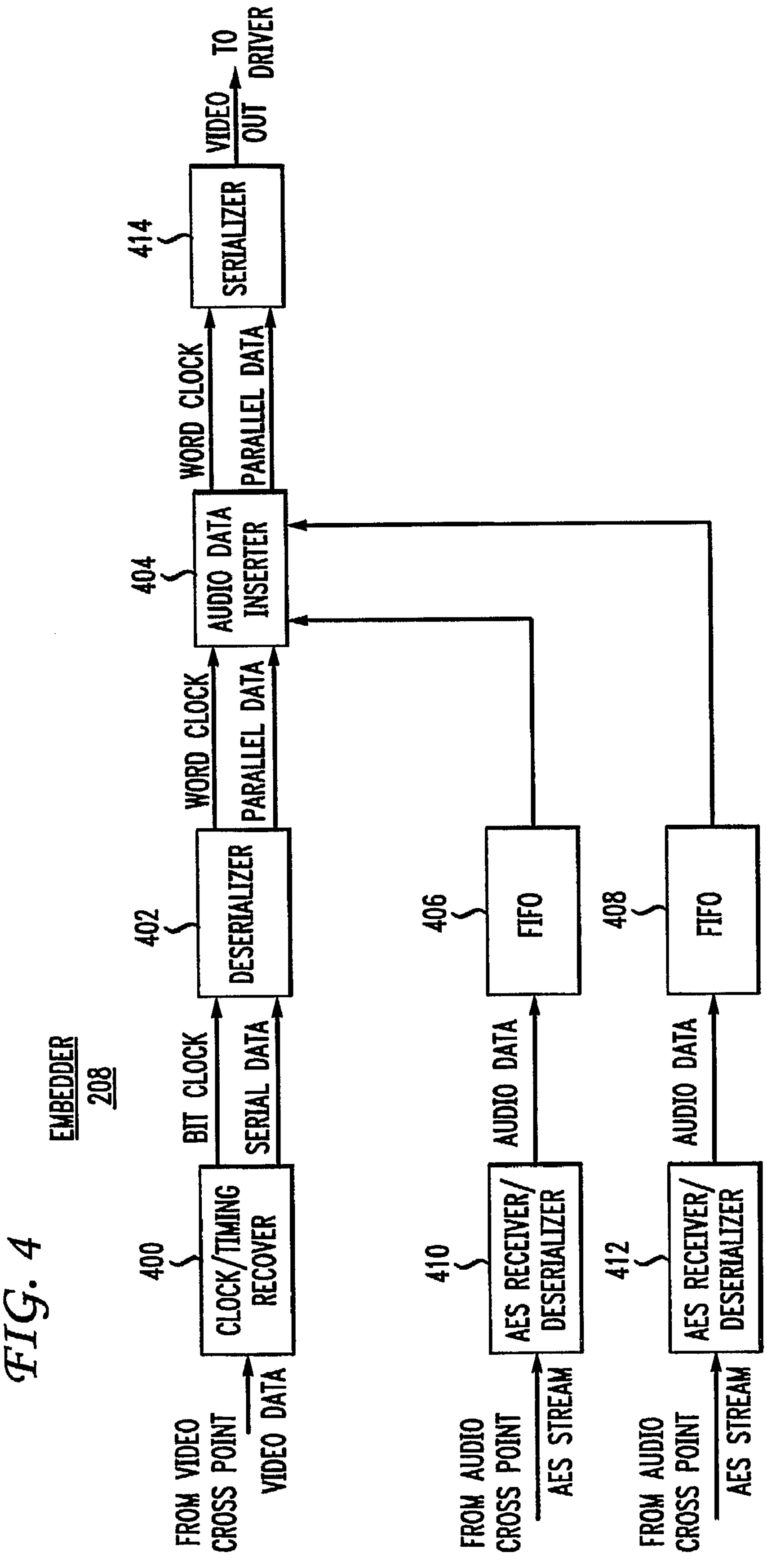
FIG. 4 depicts a block schematic diagram of an embedder circuit for use with the audio/video router of FIG. 2

FIG. 4 depicts a schematic diagram of the embedder circuit 208. The embedder circuit 208 comprises a clock/timing recovery circuit 400 similar to circuit 300 of FIG. 3. The clock/timing recovery circuit 400 receives the digital video signal output at a particular output (e.g., output #1) of the video cross-point switch 202 of FIG. 2. The clock/timing bit recovery circuit 400 recovers the clock signal from this digital video to provide a bit clock and serial data signal at the circuit output. A de-serializer circuit 402 converts the bit clock and serial data signals from the clock/timing bit recovery circuit 400 to a word clock signal and parallel data stream for input to an audio data inserter circuit 404.

The audio data inserter circuit 404 serves to insert (i.e., embed) the groups of digital audio into the video signal received from the particular output of the video cross-point switch 202, and subsequently processed by the clock/timing recovery circuit 400 and the de-serializer circuit 402. The groups of digital audio signals inserted by the audio insertion circuit 404 come from a pair of FIFO devices 406 and 408. Each of the FIFO devices 406 and 408 buffers audio data received from a separate one of AES receiver/de-serializer circuits, 410 and 412. Each of the AES receiver/de-serializer circuits, 410 and 412 receives at its input a respective AES digital audio signal group appearing at the output of the audio cross-point switch 204 that corresponds to the output of the video cross-point switch 202 that supplied the digital video signal to the clock/timing recovery circuit 400. Like the buffers 312 and 314, the FIFO devices 406 and 408 become filled to a certain level to prevent buffer underflow due to varying audio distribution.

Providing the audio inserter circuit 404 with two groups of AES digital signals (e.g, two groups of digital audio signals (e.g., two stereo AES digital signals) necessitates the use of two AES receiver/de-serializer circuits 410 and 412, and two FIFO devices 406 and 408, respectively. A larger number of groups of digital audio signals would require a greater number of devices.

The audio data inserter circuit 404 inserts the groups of digital audio signals buffered by the FIFO devices 406 and 408 into the video embodied in the parallel data stream received by the inserter circuit from the de-serializer circuit 402. In normal practice the audio data inserter will delete any existing embedded audio prior to inserting the required audio. A serializer circuit 410 generates serialized digital video signal from the word clock and parallel data stream output by the audio data inserter circuit 404.

The buffers 312 and 314 within the embedder 205 and the buffers 406 and 408 in the embedder 208 buffer or delay signals to prevent underflow (gaps) or overflow (missing) samples in either the AES stream or embedded audio. These buffers go through an initialization process during which they become filled approximately half way full before reading out data. This filling process only occurs during initialization. After initialization, the buffers 406 and 408 within the embedder 208 receive audio signals for writing into the buffer at a constant rate, but output data at a varying rate in order to match the audio distributed within the video signals. No audio exists during active portion of a video line, whereas audio can appear on the horizontal ancillary space of most lines, but not on certain lines such as the switch line. In the case of the de-embedder, the buffers 316 and 318 receive data at a varying rate, but read out data at a constant rate.

Over the course of a frame, the buffer levels will rise above and fall below the point at which initialization was completed Since different equipment/vendors use different distribution of audio in there video signals, the buffers 316 and 318 within the de-embedder 205 typically will have extra space to handle poorly distributed audio. For the embedder 208, the distribution remains known before hand. If desired, the "ready" level can undergo adjustment based on the line of the video, rather than waiting until the buffer overflows, possibly risking the loss of samples.

The foregoing describes an audio/video route that affords reduced complexity by eliminating the redundant functionality of prior art devices, and provides enhanced flexibility in the independent routing of audio groups or channels.

What is claimed is:

1. A method for routing digital audio and digital video signals, comprising the steps of:

(a) routing a digital video signal, to at least one video destination, (b) buffering at least one digital audio signal;

(c) re-timing of the digital audio signal to a prescribed timing format upon buffering a prescribed amount of the digital audio signal;

(d) routing the digital audio signal to at least one audio destination, (e) embedding the digital audio signal in the digital video signal when the digital audio signal and the digital video signal are routed to destinations that correspond with each other.

2. The method according to claim 1 further comprising the step of de-embedding the digital audio signal from the digital video signal prior to buffering.

3. The method according to claim 2 wherein each of steps (b)-(e) is repeated for each of a plurality of digital audio signals embedded in the digital video signal.

4. The method according to claim 3 further comprising the step of routing the digital audio signals from the plurality of digital audio signals to a single destination and embedding the plurality of digital audio signals in different groups of channels in a single output digital video signal.

5. The method according to claim 4 further comprising the step of dynamically changing an ordering of the groups.

6. The method according to claim 4 further comprising the step of reversing channels within a group.

7. The method according to claim 4 further comprising the step of summing channels within a group to provide a monophonic signal inserted into at least one of the channels of the group.

8. The method according to claim 2 wherein the digital audio signal is de-embedded by the steps of:

recovering a bit clock and serial data stream from the incoming digital video signal;

de-serializing the bit clock and serial data stream to yield a word clock; and a parallel data stream containing video and embedded audio; and extracting audio data from the parallel data stream.

9. The method according to claim 1 further comprising the step of retiming the digital audio signal compliant with an AES format.

10. An audio/video router comprising:

a least one de-embedder circuit for de-embedding at least one digital audio signal embedded in an incoming digital video signal to yield digital video signal and at least one digital audio signal buffered within the de-embedder to assure a sufficient amount of audio data;

a video cross-point switch for routing the digital video signal from each embedder received at a separate input of the switch to at least one switch output;

an audio cross-point switch for routing the at least one buffered digital audio signal received at a audio cross-point switch output to at least one audio cross-point switch output; and a least one embedder circuit for buffering the at least one digital audio signal routed by the audio cross-point switch and for embedding the at least one digital audio signal in the digital video signal when the digital video signal and at least one digital audio signal are routed to outputs associated with each other.

11. The audio/video router according to claim 10 wherein the at least one de-embedder circuit further comprises;

means for recovering a bit clock and serial data stream from the incoming video signal;

means for de-serializing the bit clock and serial data stream to yield a word clock; and a parallel data stream containing video and embedded audio;

means for extracting audio data from the parallel data stream;

means for buffering the extracted digital audio signal; and means for formatting the extracted digital audio signal following buffering.

12. The audio/video router of claim 11 wherein the means for buffering comprises a first-in first-out device.

13. The audio/video router of claim 10 wherein the at least one embedder circuit comprises:

means for recovering a bit clock and serial data stream from the digital video signal routed by the video cross-point switch;

means for de-serializing the bit clock and serial data stream to yield a word clock; and a parallel data stream containing the digital video signal;

means for de-serializing the digital audio signal routed by the audio cross point switch;

means for buffering the de-serialized digital audio signal;

means for inserting the buffered de-serialized digital audio signal in the parallel stream; and means for serializing the parallel data stream containing the digital video signal and the digital audio signal.

14. The audio/video router of claim 10 wherein the means for buffering comprises a first-in first-out device.

15. An audio/video router comprising:

a least one de-embedder circuit for de-embedding each of a plurality of digital audio signals embedded in an incoming video signal to yield a digital video signal and a plurality of digital audio signals, each buffered within the de-embedder to assure a sufficient amount of audio data;

a video cross-point switch for routing the digital video signal received at a separate input of the switch from each embedder to at least one switch output;

an audio cross-point switch for routing the plurality of buffered digital audio signals de-embedded from the digital video signal and received at a audio cross-point switch output to at least one audio cross-point switch output; and at least one embedder circuit for buffering the plurality of digital audio signals routed by the audio cross-point switch and for embedding the plurality of digital audio signals in the digital video signal when the digital video signal and the plurality of digital audio signals are routed to outputs associated with each other.

* * * * *